(12) United States Patent
Yates

(10) Patent No.: US 9,816,618 B2
(45) Date of Patent: Nov. 14, 2017

(54) VALVE ASSEMBLY

(75) Inventor: Lee Yates, Prescott (GB)

(73) Assignee: Chargepoint Technology Limited (GB)

( * ) Notice: Subject to any disclaimer, the term of this patent is extended or adjusted under 35 U.S.C. 154(b) by 156 days.

(21) Appl. No.: 13/805,876

(22) PCT Filed: May 31, 2011

(86) PCT No.: PCT/GB2011/051026
§ 371 (c)(1),
(2), (4) Date: Mar. 15, 2013

(87) PCT Pub. No.: WO2012/007732
PCT Pub. Date: Jan. 19, 2012

(65) Prior Publication Data
US 2013/0160863 A1    Jun. 27, 2013

(30) Foreign Application Priority Data
Jul. 16, 2010    (GB) ..................................... 1011991

(51) Int. Cl.
*F16K 1/22*    (2006.01)
*F16K 1/226*    (2006.01)
*F16K 27/02*    (2006.01)

(52) U.S. Cl.
CPC ................ *F16K 1/22* (2013.01); *F16K 1/222* (2013.01); *F16K 1/2261* (2013.01);
(Continued)

(58) Field of Classification Search
CPC .......... F16K 1/222; F16K 1/22; F16K 1/2261; F16K 27/0218; Y10T 137/598; Y10T 137/0402
(Continued)

(56) References Cited

U.S. PATENT DOCUMENTS 2,662,545 A * 12/1953 Kelley ...................... F16K 1/22
137/242
3,043,557 A * 7/1962 Stillwagon ............ F16K 1/2265
137/454.2
(Continued)

FOREIGN PATENT DOCUMENTS

DE    102008-034341 A1    1/2010
JP    2005-240614 A    9/2005
(Continued)

OTHER PUBLICATIONS

International Search Report dated Oct. 26, 2011 for PCT/GB2011/051026: 3 Pages.

*Primary Examiner* — Ian Paquette
(74) *Attorney, Agent, or Firm* — Vedder Price P.C.

(57) ABSTRACT

Valve assembly (10) comprises two valve portions, an upper and lower valve portion (12,24), each having a valve housing indicated generally at (16,18) which are generally annular and a valve closure member (20,20') which is pivotally mounted within the housing. The valve closure member (20,20') is in the form of an annular disc and is provided with spindles (22,22') by means of which the valve closure member is pivotally mounted within the housing. The valve closure member (20,20') and the spindles (22,22') are machined from a single piece of metal.

23 Claims, 3 Drawing Sheets

(52) U.S. Cl.
CPC ..... *F16K 27/0218* (2013.01); *Y10T 137/0402* (2015.04); *Y10T 137/598* (2015.04)

(58) Field of Classification Search
USPC ......... 137/15.01, 15.04, 15.05, 15.06, 15.08, 137/15.25, 237, 238, 240, 241, 246, 137/315.22; 251/305, 306
See application file for complete search history.

(56) References Cited

U.S. PATENT DOCUMENTS

| | | | | |
|---|---|---|---|---|
| 3,409,269 | A | * 11/1968 | Fawkes | ................ F16K 1/2285 251/173 |
| 4,846,225 | A | 7/1989 | Scobie | |
| 6,076,836 | A | * 6/2000 | Bretschneider | ...... B65G 69/183 251/306 |
| 2006/0021653 | A1* | 2/2006 | Weinhold | ...................... 137/240 |
| 2013/0187069 | A1* | 7/2013 | Ranpuria | ...................... 251/212 |

FOREIGN PATENT DOCUMENTS

| | | |
|---|---|---|
| WO | 2007/107500 A1 | 9/2007 |
| WO | 2010-092395 A1 | 8/2010 |

* cited by examiner

VALVE ASSEMBLY

The present invention relates to valves, and in particular, but not exclusively, to valves for controlling, charging, discharging and/or regulating the flow of powders and/or fluids.

Valves, such as split butterfly valves, are available in many designs and used widely for processes where product containment is required to prevent product exposure to environment and personnel working in close proximity of the product. The split valves are designed predominantly for handling and contained transfer of solid state powders, granular material, liquids, slurries and the like.

Split valve design allows the valve to be split open into two halves, commonly called alpha and beta halves, or active and passive halves. The valve design is such that when split, the two halves keep the contents on either side sealed and contained.

Similar to the split butterfly valve, a split ball valve can also be used for contained transfer of solids and more commonly liquids. Historically, these valves have mainly been used in pharmaceutical and biotech industries for non-sterile operations.

In sterile equipment design, full systems need to be sterilised or decontaminated and, once sterilised or decontaminated, it is important to ensure sterility is maintained throughout the processing cycle, for example, adding of materials, discharging of materials, any process transfers between systems etc.

Split valves can be sterilised or decontaminated via a number of known methods, which include autoclaving, passing steam through the open valve, or passing other gases, such as vapourised hydrogen peroxide, through them prior to any product coming in contact with the internal surfaces or product contact parts.

Unfortunately, when one of these conventional known valves is split, sterility is lost, as some of the critical surfaces of the valve and seats, when split into two halves, become exposed to the outside surrounding non-sterile atmosphere and contaminated. If the split valve is subsequently re-docked, and opened up for transfer of material, the entire system can lose sterility and result in product contamination.

In the manufacture of pharmaceuticals, chemicals or biological material, effective containment is essential for the safe and hygienic handling of such compounds and materials. At each stage of the manufacturing process, handling must be controlled and managed to provide optimum protection for the operator and for maintaining the integrity of the product.

The material being handled is often hazardous to health, owing to the increasing potency of many new active pharmaceutical ingredients (APIs). Pharmaceutical and biomanufacturing products are often manufactured under strict controls against product contamination. This is because the products are often for human consumption and the industries are heavily regulated by bodies like the FDA (Food and Drug Administration) in the United States and the MHRA (Medicines and Healthcare Products Regulatory Agency) in the United Kingdom. Furthermore, the APIs may, in sufficient quantities, be hazardous to the health of an operator. It is therefore necessary to avoid direct contact between an operator and the potentially hazardous material.

To avoid such direct contact, there is an increasing requirement to mount containment enclosures around process equipment. However, the design of such enclosures must minimise any hindrance to the operation of the equipment. When using a split valve assembly, this can become difficult for an operator to handle in such contained environments.

In addition, at the conclusion of each processing operation, the interior surfaces of the structure enclosing the processing zone must be thoroughly cleaned by the operator prior to a further processing operation to minimise the risk of cross-contamination. Consequently, the pharmaceutical manufacturing industry demands good containment performance to achieve acceptable operator exposure levels.

For handling a solid (e.g. powder) or liquid product of a sensitive or hazardous (e.g. toxic) nature in a processing zone, there are available a number of different types of containment assembly. One such conventional containment assembly is a barrier isolator with gloved access to the processing zone in which a product and/or handling equipment may be manipulated. A barrier isolator may offer two fold protection, namely the use of glove ports to maintain a physical barrier between the product and the operator and an extraction fan system to create an air flow for removing airborne particles from the processing zone and capturing the particles by means of filters. In this manner, a barrier isolator can achieve high containment typically down to nanogram level.

However, isolators designed for containment and sterility combined together, maintaining a sterile and sealed environment, both for the integrity of the material being handled and an operator's health, can be very expensive.

PCT/GB10/050901 discloses a split butterfly valve having two valve halves: a passive and an active. Each valve half has a housing having a valve seat and a disc. The disc is displaced to open and close the valve and forms a seal with the valve seat in the closed configuration. In use, the passive and active are brought together and an intermediate configuration is obtained where the two halves of the valve are docked and form a chamber between the discs. A sterilising or decontaminating medium is introduced to clean the surfaces of the discs to prevent contamination. The two valve halves are then fully engaged and the discs are then free to open to transfer material therebetween.

However, such systems in certain applications need to operate under high pressure and be capable of holding pressure between the active and passive disc when the two valve halves are separated in the undocked configuration and when docked but in the intermediate configuration where a chamber or sealed void is formed between the discs of the valve halves. The ability to hold pressure would be particularly advantageous as a gas could be used to decontaminate the surfaces of the discs and valve halves in the intermediate configuration or sealed void.

However, with known split valves there is a propensity for material being transferred between the valve halves, such as powder or the like, to become trapped between the disc and the sealing surface of the valve seats. This in turn causes the valve seal to fail and prevents sterilising or decontaminating medium from being introduced to the sealed void under pressure as the sterilising or decontaminating medium would contaminate the material to be transferred between the valve halves, bypassing the valve disc where the seal has failed. Failure of the valve as described above can also lead to contamination of the surrounding environment and/or the material to be transferred, which in many cases can be sensitive material requiring strict containment.

It is an object of the present invention to overcome or alleviate one or more of the problems associated with the prior art.

In accordance with the present invention, there is provided a split valve assembly comprising two valve portions complementarily shaped such that the first can sealingly engage with and co-operate with the second to allow the movement of material therethrough, each valve portion comprising a housing, a valve seat and a valve closure member moveable between a first position in which the valve closure member is displaced from the valve seat and the valve is open, and a second position in which the valve closure member co-operates with the valve seat and the valve is closed, a sealing surface formed therebetween, wherein the assembly has a first configuration in which the first and second valve portions engage with one another, the valve closure members being closed, and the valve closure members being disposed a distance apart defining, with the housing, a chamber therebetween, which is capable of being sealed from the surrounding environment, having an inlet and an outlet through which sterilising or decontaminating medium may pass, and a second configuration in which the valve closure members engage with one another and are movable from their first to their second position, and a third configuration in which the two valve portions are disengaged from one another, and wherein each valve portion has means for cleaning the sealing surface between said valve seat and valve closure member.

Preferably, in the third configuration the two valve portions are undocked, in the first configuration the two valve portions are partly docked and in the second configuration the two valve portions are completely docked.

The valve of the present invention is able to operate in a complete sterile or decontaminated manner, by use of an 'in situ' sterilisation or decontamination step applied before completion of each docking (i.e. when in said first configuration), regardless of how many times the valve is split open and re-docked, i.e. engaged and disengaged, ensuring sterile or near sterile conditions on product or material contact surfaces.

The present invention allows the valve to have a capability to have an intermediate stage, a first configuration, during docking that allows a chamber which can be isolated from the surrounding environment to be formed between the surfaces which have been exposed to the atmosphere and which are not sterilised or decontaminated. These surfaces need to be sterilised or decontaminated before they can become exposed to the internal sterile parts of the assembly and material which may pass therethrough when the valve is fully docked and open so as to prevent contamination.

The means for cleaning the sealing surface may comprise, in the case of a split butterfly valve, for example, the valve closure member being capable of rotation beyond the formation of a seal between the valve closure member and the valve seat. In such an embodiment, a seal between the valve closure member and the valve seat is obtained when the plane of the valve closure member is [substantially] perpendicular to the plane of the valve seat and the direction of flow of material. Preferably, the means for cleaning the sealing surface comprises the rotation of the valve closure member more than 90 degrees with respect to the plane of the valve seat. The 'over-rotation' beyond 90 degrees allows the valve closure member to scrape off any residual material, such as powder that may be disposed at the sealing surface of the valve seat to ensure that when the valve closure member is subsequently in its closed configuration, perpendicular to the valve seat, there is a good seal therebetween and sterilising or decontaminating medium can be introduced under pressure without fear of the seal failing.

The means for cleaning the sealing surface may alternatively or additionally comprise one or more protuberance disposed on the valve closure member. The one or more protuberance preferably are disposed such that they can engage with the sealing surface of the valve seat. In use, the protuberance can displace any residual material located at the sealing surface to ensure a good seal between the valve closure member and the valve seat. The one or more protuberance preferably extends around the perimeter of the valve closure member. More preferably, in one embodiment, the one or more protuberance extends around the circumference of the valve closure member.

Preferably, the protrubrance forms an abrasive surface for dislodging any residual material located at the sealing surface of the valve housing.

Preferably, the one or more protrubrance comprises any one or more of one or more ridges, one or more dimples or the like.

The present invention allows sterilisation or near sterilisation to be maintained throughout the process of several product or material transfers, and is capable of allowing several dockings and un-dockings (engagement and disengagement), without compromising the sterility or near sterility of the material to be transferred or internal process equipment upon which the valve portions of the present invention may be mounted. The chamber may also be cleaned using fluid gases or fluids before and after the sterilisation step, or in any sequence during the engagement/disengagement cycle.

Each valve portion of the assembly may be mountable on a vessel for containing material, conveyance means, such as a hose, for conveying material and/or other process equipment known to the art. The means for mounting the valve portions may comprise any means known to the art, such as for example a screw thread, interference fit, bayonet attachment etc. In an alternative embodiment, the valve portions may be integrally formed with a vessel or conveyance means.

The inlet and outlet of the chamber may be closed once the movement from the first to the second configuration is complete. In so doing, the assembly ensures that the material being transferred therethrough is not contaminated with sterilising or decontaminating medium.

The valve seat and valve closure member are preferably complementarily shaped to ensure that a seal is formed when the valve closure member is closed.

The valve assembly may be a split butterfly valve, split ball valve, any other split valve or quick release coupling known to the art. Preferably, the assembly is a split butterfly valve.

The inlet and/or outlet of the chamber may be formed in the housing of one of the valve portions. Preferably, both the inlet and the outlet are formed in the housing of one of the valve portions.

Preferably, the valve portions form a mating pair, one being a male valve portion, the other female. The inlet and/or outlet may be formed in the housing of one or both or the valve portions. More preferably, the inlet and outlet for the chamber is formed in the female valve portion.

In one embodiment, the chamber has circular cross section.

The valve closure member may be pivotally mounted within the valve housing by means of opposed spindles projecting from the closure member and located in corresponding recesses within the valve housing. The valve housing may be provided with a valve seat and the valve closure member can be pivotable into and out of engagement with the valve seat to close and open the valve respectively. Preferably, the spindles are integrally formed with the valve closure member. Advantageously, the spindles and the valve closure member, may be machined from a single piece of material.

In one embodiment, the valve closure member being pivotable beyond the position in which further displacement is normally prevented by engagement with the valve seal, the valve may further comprise biassing means for biassing the valve closure member into a position beyond its normal closed position, whereby in the absence of the valve seal the valve closure member will engage the valve seat.

In order to ensure that the chamber, defined by the housing of one or both of the first and second valve portions and the valve closure members, is capable of being sealed from the surrounding environment, an O ring and/or inflatable seal may be disposed on the housing of one or both of the valve portions. This ensures that during cleaning, whereby sterilising or decontaminating medium is passed through the chamber when the assembly is in its first configuration and when material is transferred through the valve there is a significantly reduced possibility of cross-contamination between the chamber and the surrounding environment, thus ensuring that the material transferred is not contaminated and maintaining operator safety.

The sterilising or decontaminating medium suitable for use with the assembly of the present invention may comprise a fluid, vapour and/or gas. Preferably, the sterilising or decontaminating medium is introduced under pressure. Preferably, the medium is vaporised hydrogen peroxide, filtered nitrogen, filtered air and/or water. For materials sensitive to heat, vaporised hydrogen peroxide is preferably used, whilst for materials not generally heat sensitive, steam under pressure at temperatures up to 135° C. can be used. Pressurised and filtered air and/or nitrogen or other such gases may be used as a cleaning medium to blow any debris, particles, residues, impurities etc. out of the chamber in lieu of or in combination with other sterilising or decontaminating media. If it is to be used as a sterilising or decontaminating medium, then the aim is preferably filtered to remove potential contaminants.

The outlet may be connected to filter means and/or a catalyst to treat any waste stream from the chamber. Preferably, when vapourised hydrogen peroxide is used, the outlet is connected to a catalyst to treat the waste stream.

During use, the assembly may be switched from the first to the second configuration to allow material to be transferred therethrough. Once the material has been transferred, the assembly is switched back to the first configuration and the surfaces which are to be exposed to the surrounding environment cleaned before disengaging the two valve portions so as to prevent the operator from being exposed to any residual material left on the exposable surfaces, and thus ensuring operator safety.

In accordance with a further aspect of the present invention, there is provided a method of moving a material from one vessel to another without exposing the material to the surrounding environment comprising the use of a valve assembly as described hereinabove, the method comprising the steps of:

(a) Engaging the valve portions such that the assembly conforms to its first configuration;
(b) optionally cleaning the chamber;
(c) sterilising or decontaminating the chamber;
(d) displacing the valve portions such that the assembly conforms to its second configuration; and
(e) opening the valve to allow the movement of material therethrough.

Once the requisite quantity of material has been transferred, the method may also comprise the subsequent steps of:

(f) displacing the valve portions such that the assembly conforms to its first configuration;
(g) optionally cleaning the chamber;
(h) optionally sterilising or decontaminating the chamber; and
(i) disengaging the valve portions.

By way of example only, a specific embodiment of the present invention will now be described, with reference to the accompanying drawings, in which.

Figure 1:
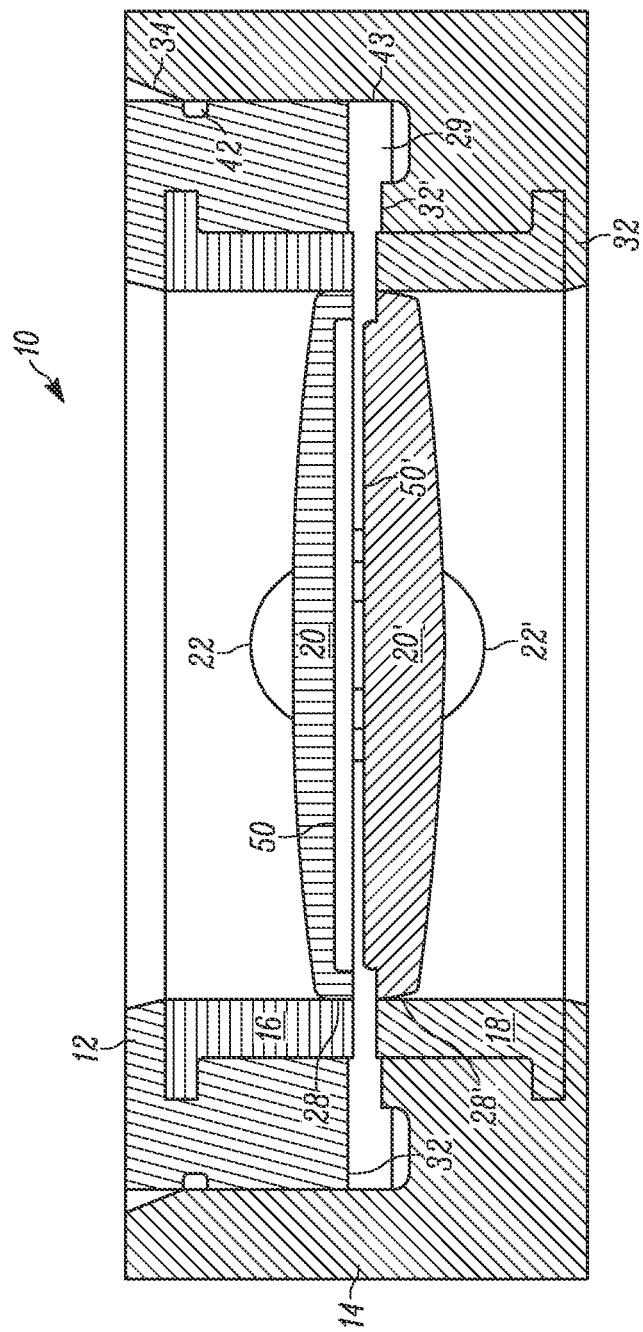
FIG. 1 is a cross sectional side elevation of two valve portions of a valve assembly engaged with one another in an intermediate configuration in accordance with the present invention.
Figure 2:
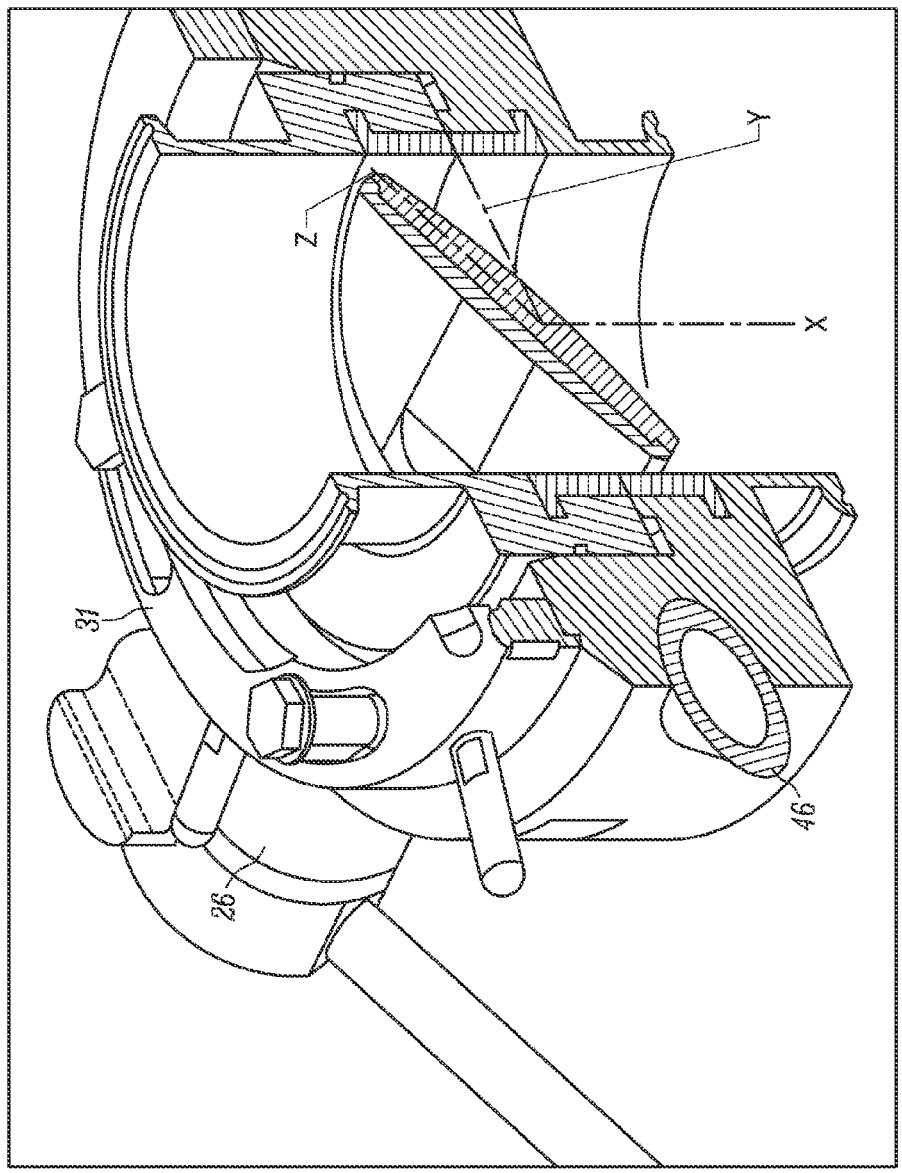
FIG. 2 is a cross sectional perspective view of a valve assembly in its first configuration in accordance with the present invention.
Figure 3:
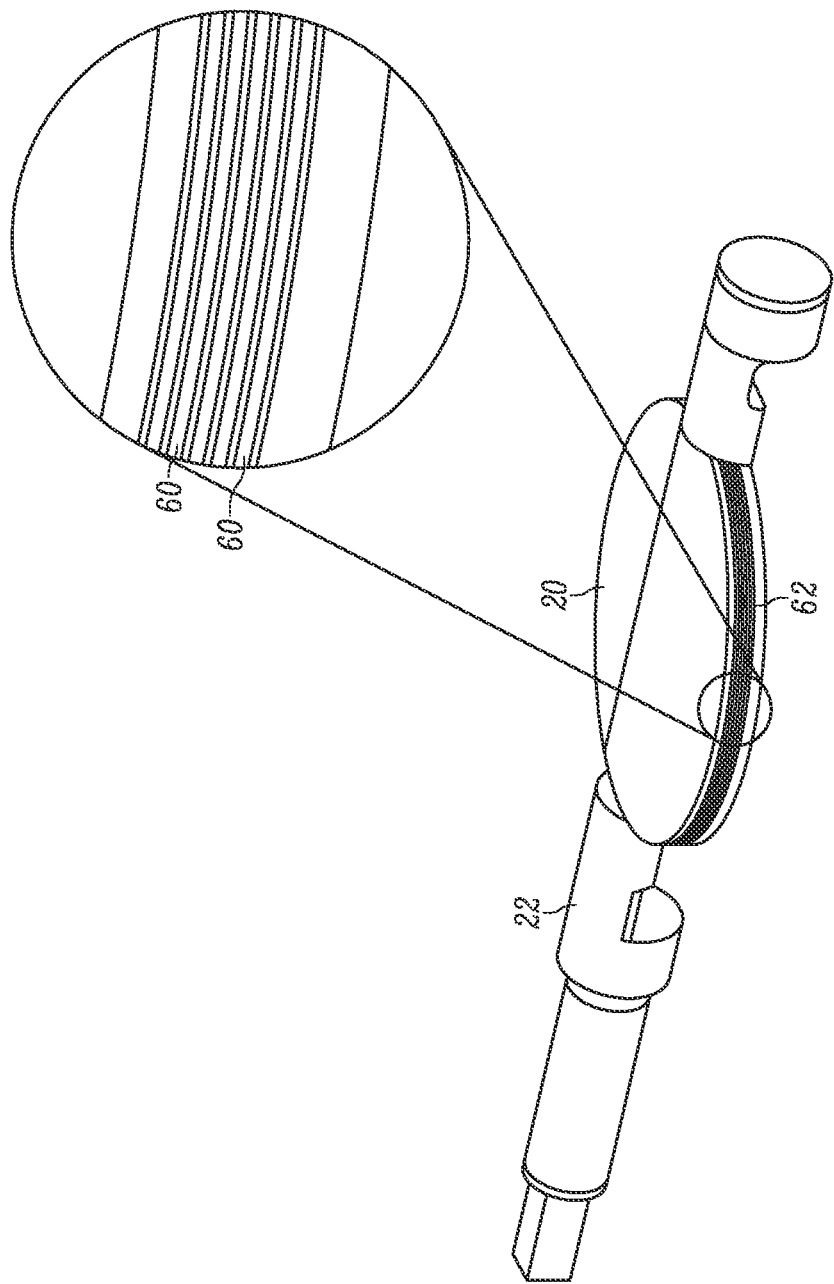
FIG. 3 shows the edge of a valve closure member in accordance with the present invention.

Referring firstly to FIGS. 1 to 3, the valve assembly 10 comprises two valve portions, an upper and lower valve portion 12, 14 each having a valve housing indicated generally at 16, 18 which are generally annular and a valve closure member 20, 20' which is pivotally mounted within the housing. The valve closure member 20, 20' is in the form of an annular disc and is provided with spindles 22, 22' by means of which the valve closure member is pivotally mounted within the housing. The valve closure member 20, 20' and the spindles 22, 22' are machined from a single piece of metal.

One of the spindles 22 of the lower valve closure member 18 is adapted to be received by a further spindle (not shown) of actuator 26, whilst the housing of lower valve portion 18 has a bore receiving the other spindle 22'. Thus, the annular disc is journalled for rotation on the spindles 22, 22' and is moved by rotation of the spindle of actuator 26. A manual actuator 26 is received on an opposite end to the annular disc of the spindle. A pneumatic or automatic actuator can be used in an alternative embodiment.

The valve closure member 20, 20' is engageable with and disengageable from an annular valve seat in the form of an annular seal 28, 28'. The seal comprises a EPDM annular abutment portion (alternatively, perfluoroelastomer or any other suitable material can be used) which, in use, engages the valve closure member 20, 20'.

The valve assembly comprises releasably securable valve portions 16, 18 via locking ring 31 which prevents the valve portions from disengaging.

Alternatively, in an alternative embodiment, the valve portions can be releasably locked using a moveable pin which can engage with a complementary shaped bore to lock the two valve portions together as described in PCT/GB10/0502288.

Furthermore, in another embodiment the docking system is so designed to hold the two halves in the correct position without the use of a locking ring or locking mechanism.

The outer end face 32, 32' of each or the valve housing portions 16, 18 is planar and in use each face is connected to, for example, adjacent piping sections or a vessel in a manner well known to in the art and a through passage is formed by means of, for example, aligned bores. Upper valve portion 16 has an annular recess 34 which receives O-ring 42. When the valve portions 16, 18 are brought together, O-ring 42 co-operates with the inner side wall 43 of the housing of valve portion 18 to form a seal which is important when the valve is in its intermediate configuration, as explained below.

The abutment of the two valve housing portions 16, 18 form a mating pair such that the upper valve portion 16 is mounted within the lower valve housing portion 18, the upper valve portion 16 being male and the lower valve portion 18 being female. In a first configuration (see FIG. 2) the two valve portions are engaged, such that the chamber is sealed from the surrounding environment and that material to be transferred through the valve will not be contaminated by the surrounding environment. In FIG. 1 the valve assembly is in its intermediate configuration and defines the two valve portions 16, 18 define a chamber 29 therebetween. The chamber is defined by the valve closure members 20, 20' and the seal formed between inner side wall 43 of valve portion 18 and O-ring 42.

In this way, the two portions of the valve 16, 18 can be sealed with respect to the exterior environment whilst defining a chamber between valve closing members 20, 20' and the housings of valve portions 16, 18 by means of the co-operation between O-ring 42 and side wall 43. Any misalignment of the two body halves may be overcome in several ways, a preferred way being to provide longitudinally captivated locators between the two body halves.

Lower valve portion 18 has a tangential inlet (not shown) and a tangential outlet 46 which communicate with chamber 29 when formed by bringing the two valve portions 16, 18 together in the first configuration. The inlet and outlet are disposed about the radius of chamber 29. Sterilising or decontaminating medium in the form of a liquid, gas and/or vapour will be fed into the chamber 29 via inlet 44 under pressure. The sterilising or decontaminating medium can then be removed from the chamber 29 via outlet 46 which may be connected to a vacuum pump, fan via a filter and/or catalyst to assist in the removal of sterilising or decontaminating medium and debris.

The valve closure members are adapted to be pivotable through more than 90 degrees, and when in its fully open position the profile of the inner face 50, 50' of the valve closure member 20, 20' corresponds with the profile of the through bore of the valve housing, thereby creating no restrictions for the flow of fluid or other material.

It is the rotation beyond 90 degrees of the engaged discs 20, 20' that enables the edge of the discs to ensure that any material at the sealing surface left from a previous material transfer is to be scraped from the site. FIG. 2 shows the angle of rotation of engaged discs 20, 20': the angle between lines X and Y being 90 degrees and the angle between lines X and Z being greater than 90 degrees. When the valve assembly is in its intermediate configuration, the chamber 29 can be subjected to pressurised sterilisation or decontamination without any risk of leakage of the sterilising or decontaminating medium beyond the sealing surface and contaminating the material to be transferred.

FIG. 3 shows an alternative embodiment having a plurality of ridges 60 disposed on the side 62 of a disc 20, which could additionally or alternatively be also disposed on disc 20'. Each ridge acts to scrape any residual material from the sealing surface to ensure an effective seal once the valve is closed.

When the valve closure members 20, 20' have been exposed to the sterilising or decontaminating medium for a sufficient time to ensure that any impurities or contaminants have been removed or neutralised, any residual sterilising or decontaminating medium can be expelled using pressurised filtered air introduced via inlets 44, 44'. The valve assembly can then be fully engaged in its second configuration, whereby seats 28, 28' mate to form a seal and valve closure members 20, 20' contact one another and can rotate to open each valve portion respectively, which are sealingly engaged thereby allowing the passage of material therethrough without the material becoming contaminated. Rotation of the spindles 22, 22' of the lower valve closure member 20' will result in rotation of the upper valve closure member 20'.

The valves of the present invention are able to operate in a complete sterile or near sterile manner, with an in situ sterilisation or decontamination step before and after each docking, regardless of how many times the valve is split open and re-docked, ensuring sterile or near sterile conditions on product contact parts.

The invention allows the valve to have a capability to have an intermediate stage, a first configuration, during docking that allows a barrier to be present between internal process sterile areas and the previously exposed areas which are not sterilised or decontaminated but need to be sterilised or decontaminated before they can become part of the internal sterile parts when the valve is fully docked. These "intermediate transit contact parts" have another barrier to the outside; the parts and surfaces beyond this barrier do not require sterilisation or decontamination.

These barriers can be created by any combination of seals, gaskets, O-rings, seats and/or inflatable seals.

In the intermediate docking position, the valve allows the two halves of the butterfly disc to be separated by a nominal space which is wide enough to allow irrigation of all surfaces by either steam, cleaning agents, sterilising or decontaminating fluids, or gases such as vapourised hydrogen peroxide, or combinations of any or all.

The valve also has inlet entry points where these sterility or decontamination liquids, gases or vapours can enter, freely flow over all intermediate surfaces, saturate all surfaces and then leave the valve intermediate areas through exit points where the sterility or decontaminating medium can either be re-circulated or exhausted as once through fluids.

Once the sterility or decontamination cycle is completed, the valve can be fully docked, engaged, into its second configuration. Once fully docked, the intermediate parts, which are now sterile or decontaminated, can become part of the internal process contact parts. Opening the valve for flow allows material to pass through the sterilised or decontaminated surfaces, in contrast to the prior art.

Once transfer is completed, before final undocking, disengagement, of the valve portions, a clean in place (CIP) cycle can be carried out to remove any remaining debris of product from the areas which later will become exposed to the atmosphere, thereby providing high containment of the drug from operator exposure. The valve can be closed and returned to its intermediate position, first configuration, whereupon any residual material left on the surfaces can be cleaned using CIP gases or fluids introduced to and removed from the chamber via inlets 44, 44' and outlets 46, 46'. Once "cleaned" the valve can be undocked and split into two halves.

When the valve is split open into two halves, any material disposed within a vessel etc. will maintain its sterility or near sterility as each valve portion is sealed from the surrounding atmosphere by the valve closure members.

The invention is not restricted to the details of the foregoing embodiments. For example, the valve actuator may be replaced with a different actuator, such as an automated actuator.

An alternative embodiment of the present invention replaces the butterfly valve closure members of the valve with ball closure members.

The invention claimed is:

1. A split valve assembly comprising two valve portions complementarily shaped such that the first can sealingly engage with and co-operate with the second to allow the movement of material therethrough, each valve portion comprising a housing, a valve seat and a valve closure member moveable between a first position in which the valve closure member is displaced from the valve seat and the valve is open, and a second position in which the valve closure member co-operates with the valve seat and the valve is closed, a sealing surface formed therebetween, wherein the assembly has a first configuration in which the first and second valve portions engage with one another, the valve closure members being closed, and the valve closure members being disposed a distance apart defining, with the housing, a chamber therebetween, which is capable of being sealed from the surrounding environment, having an inlet and an outlet through which sterilising medium may pass, and a second configuration in which the valve closure members engage with one another and are movable from their first position to their second position, and a third configuration in which the two valve portions are disengaged from one another, and wherein each valve portion has a plurality of ridges disposed on the valve closure for cleaning the sealing surface between said valve seat and valve closure member, wherein each valve closure member is configured to rotate more than 90 degrees with respect to a plane of the valve seat to scrape clean the sealing surface between said valve seat and valve closure member.

2. A valve as claimed in claim 1 wherein the inlet and outlet of the chamber is closed once the movement from the first to the second configuration is complete.

3. A valve as claimed in claim 1 wherein the valve seat and valve closure member are preferably complementarily shaped to ensure that a seal is formed when the valve closure member is closed.

4. A valve as claimed in claim 1 wherein the inlet and/or outlet of the chamber is formed in the housing of one of the valve portions.

5. A valve as claimed in claim 1 wherein the valve portions form a mating pair, one being a male valve portion, the other female.

6. A valve as claimed in claim 1 wherein the valve closure member is pivotable beyond the position in which further displacement is normally prevented by engagement with the valve seal, the valve further comprises biasing means for biasing the valve closure member into a position beyond its normal closed position, whereby in the absence of the valve seal the valve closure member will engage the valve seat.

7. A valve as claimed in claim 1 wherein the chamber, defined by the housing of one or both of the first and second valve portions and the valve closure members, is capable of being sealed from the surrounding environment, by means of an O ring and/or inflatable seal.

8. A valve as claimed in claim 1 wherein the outlet is connected to filter means and/or a catalyst to treat any waste stream from the chamber.

9. A valve as claimed in claim 1 wherein in the third configuration the two valve portions are undocked, in the first configuration the two valve portions are partly docked and in the second configuration the two valve portions are completely docked.

10. A valve as claimed in claim 9 wherein the valve portions are integrally formed with a vessel or conveyance means.

11. A valve as claimed in claim 1 wherein each valve portion of the assembly is mountable on a vessel for containing material or conveyance means.

12. A valve as claimed in claim 11 wherein the means for mounting the valve portions comprises at least one of a screw thread, an interference fit or a bayonet attachment.

13. A valve as claimed in claim 1 wherein the valve assembly is a split butterfly valve, split ball valve or quick release coupling.

14. A valve as claimed in claim 13 wherein the valve assembly is a split butterfly valve.

15. A valve as claimed in claim 1 having circular cross section.

16. A valve as claimed in claim 15 wherein the inlets and/or outlets are tangentially disposed with respect to the circumference of the chamber which is formed by the first and second valve portions.

17. A valve as claimed in claim 1 wherein the valve seat comprises a seal member.

18. A valve as claimed in claim 17 wherein the seal member comprises an abutment portion and a resiliently deformable portion located between the abutment portion and the valve housing.

19. A valve as claimed in claim 1 wherein the sterilising medium comprises a fluid, vapour and/or gas.

20. A valve as claimed in claim 19 wherein the medium is vaporised hydrogen peroxide, filtered nitrogen, filtered air and/or water.

21. A method of moving a material from one vessel to another without exposing the material to the surrounding environment comprising the use of a valve assembly as described in claim 1, the method comprising the steps of:
 a) engaging the valve portions such that the assembly conforms to its first configuration;
 b) cleaning the chamber;
 c) sterilising or decontaminating the chamber;
 d) displacing the valve portions such that the assembly conforms to its second configuration; and
 e) opening the valve to allow the movement of material therethrough.

22. A method as claimed in claim 21 wherein once the requisite quantity of material has been transferred, the method also comprises the subsequent steps of:
 f) displacing the valve portions such that the assembly conforms to its first configuration;
 g) cleaning the chamber;
 h) sterilising or decontaminating the chamber; and
 i) disengaging the valve portions.

23. A coupling assembly comprising two coupling portions complementarily shaped such that the first can sealingly engage with and co-operate with the second to allow the movement of material therethrough, each coupling portion comprising a housing, a coupling seat and a coupling closure member moveable between a first position in which the coupling closure member is displaced from the coupling seat and the coupling is open, and a second position in which the coupling closure member co-operates with the coupling seat and the coupling is closed, wherein the assembly has a first configuration in which the first and second coupling portions engage with one another, the coupling closure members being closed, and the coupling closure members being disposed a distance apart defining, with the housing, a chamber therebetween, which is capable of being sealed from the surrounding environment, having an inlet and an outlet through which sterilising medium may pass, and a second configuration in which the coupling closure members engage with one another and are movable from their first position to their second position, and a third configuration in which the two coupling portions are disengaged from one another, wherein each coupling portion has a plurality of ridges for scraping clean the sealing surface between said coupling seat and said coupling closure member by the rotation of the coupling closure member more than 90 degrees with respect to a plane of the coupling seat.

* * * * *